(12) United States Patent
Lim et al.

(10) Patent No.: US 10,250,317 B2
(45) Date of Patent: Apr. 2, 2019

(54) FULL-DUPLEX COMMUNICATION METHOD FOR MULTI-HOP WIRELESS NETWORK

(71) Applicant: GWANGJU INSTITUTE OF SCIENCE AND TECHNOLOGY, Gwangju (KR)

(72) Inventors: Hyuk Lim, Gwangju (KR); Wooyeol Choi, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 19 days.

(21) Appl. No.: 15/470,868

(22) Filed: Mar. 27, 2017

(65) Prior Publication Data
US 2017/0302361 A1 Oct. 19, 2017

(30) Foreign Application Priority Data
Mar. 17, 2016 (KR) .................. 10-2016-0031802

(51) Int. Cl.
*H04B 7/155* (2006.01)
*H04L 1/16* (2006.01)
(Continued)

(52) U.S. Cl.
CPC ....... *H04B 7/15585* (2013.01); *H04B 7/2606* (2013.01); *H04L 1/16* (2013.01);
(Continued)

(58) Field of Classification Search
CPC .... H04B 7/15585; H04B 7/2606; H04B 1/54; H04L 5/14; H04L 5/00; H04L 5/003; H04L 5/1461; H04L 1/16
(Continued)

(56) References Cited

U.S. PATENT DOCUMENTS

2009/0034437 A1* 2/2009 Shin ................... H04B 7/15585
370/278
2009/0247072 A1* 10/2009 Nakamura ......... H04B 7/15557
455/11.1
(Continued)

FOREIGN PATENT DOCUMENTS

KR 10-2009-0108545 A 10/2009
KR 10-2011-0110733 A 10/2011
(Continued)

OTHER PUBLICATIONS

Chen, B., et al., "AirExpress: Enabling Seamless In-band Wireless Multi-hop Transmission," ACM International Conference on Mobile Computing and Networking (MobiCom), Sep. 2015, pp. 566-577, Paris, France.
(Continued)

*Primary Examiner* — Rownak Islam
(74) *Attorney, Agent, or Firm* — Womble Bond Dickinson (US) LLP; Joseph Bach, Esq.

(57) ABSTRACT

A full-duplex communication method for a multi-hop wireless network including a source end for transmitting data, a destination end as a destination of the data and at least one relay for connecting the source end and the destination end wirelessly includes sending a transmission request from the source end to the destination end through the at least one relay in forward order, sending a transmission confirmation from the destination end to the source end through the at least one relay in reverse order in response to the transmission request and the at least one relay entering a ready state, and transmitting the data from the source end to the destination end through the at least one relay using a full-duplex scheme after receiving the transmission confirmation.

8 Claims, 10 Drawing Sheets

(51) Int. Cl.
*H04L 5/14* (2006.01)
*H04B 7/26* (2006.01)
*H04L 5/00* (2006.01)
*H04B 1/54* (2006.01)

(52) U.S. Cl.
CPC .............. *H04L 5/14* (2013.01); *H04L 5/1461* (2013.01); *H04B 1/54* (2013.01); *H04L 5/00* (2013.01)

(58) Field of Classification Search
USPC ........................................................ 370/279
See application file for complete search history.

(56) References Cited

U.S. PATENT DOCUMENTS

| | | | | |
|---|---|---|---|---|
| 2012/0106405 A1* | 5/2012 | Lioliou | ............. | H04B 7/15528 370/279 |
| 2014/0161015 A1* | 6/2014 | Brown, III | ............. | H04L 45/10 370/312 |
| 2014/0307664 A1* | 10/2014 | Chen | .................... | H04B 7/0456 370/329 |
| 2015/0016309 A1* | 1/2015 | Fang | ........................ | H04L 5/14 370/277 |
| 2015/0156004 A1* | 6/2015 | Khandani | ............ | H04L 5/1423 370/278 |
| 2015/0382375 A1* | 12/2015 | Bhushan | ............... | H04L 5/0005 370/252 |
| 2018/0131471 A1* | 5/2018 | Ahn | ...................... | H04L 1/1664 |

FOREIGN PATENT DOCUMENTS

| | | |
|---|---|---|
| KR | 10-1236078 B1 | 2/2013 |
| KR | 10-2013-0061326 A | 6/2013 |

OTHER PUBLICATIONS

Office Action for Korean Patent Application No. 10-2016-0031802 dated Feb. 10, 2017.
Notice of Allowance for Korean Patent Application No. 10-2016-0031802 dated Aug. 10, 2017.

\* cited by examiner

FULL-DUPLEX COMMUNICATION METHOD FOR MULTI-HOP WIRELESS NETWORK

RELATED APPLICATION

This present application claims priority benefit from Korean Patent Application No. 10-2016-0031802, filed on Mar. 17, 2016, the disclosure of which is incorporated herein by reference in its entirety.

TECHNICAL FIELD

The present invention relates to a full-duplex communication method for a multi-hop wireless network.

BACKGROUND ART

As a next-generation wireless communication method, various technologies for 5G wireless networking have been introduced. Thereamong, research into a full-duplex communication method capable of simultaneously performing transmission and reception has been actively conducted. The full-duplex communication method can improve network throughput but cannot be implemented due to self-interference of a radio node.

Therefore, technology for performing a full-duplex communication method by cancelling self-interference has been introduced. For example, in [B. Chen, Y. Qiao, Q. Zhang, and K. Srinivasan, "AirExpress: Enabling seamless in-band wireless multi-hop transmission," in ACM International Conference on Mobile Computing and Networking (MobiCom), 2015], a relay node transmits a training sequence such that the transmitted training sequence moves in an interference path to receive a sequence having overlapping interference signals. The overlapping training sequence is hierarchically analyzed to continuously estimate interference channels in reverse order, thereby cancelling the interference.

However, the method of hierarchically estimating and cancelling interference may cause error propagation if interference channel estimation is inaccurate. Of course, if the number of relay nodes increases, the full-duplex communication method can not be performed.

RELATED ART DOCUMENT

Non-Patent Document (Non-patent Document 1) B. Chen, Y. Qiao, Q. Zhang, and K. Srinivasan, "AirExpress: Enabling seamless in-band wireless multi-hop transmission," in ACM International Conference on Mobile Computing and Networking (MobiCom), 2015.

DISCLOSURE

Technical Problem

An object of the present invention is to provide a full-duplex communication method for a multi-hop wireless network, which is capable of stably performed with high efficiency.

Technical Solution

In order to achieve the object of the present invention, self-interference and intra-flow interference (IFI) are estimated per node and cancelled.

According to an aspect of the present invention, a full-duplex communication method for a multi-hop wireless network including a source end for transmitting data, a destination end as a destination of the data and at least one relay for connecting the source end and the destination end wirelessly includes sending a transmission request from the source end to the destination end through the at least one relay in forward order, sending a transmission confirmation from the destination end to the source end through the at least one relay in reverse order in response to the transmission request and the at least one relay entering a ready state, and transmitting the data from the source end to the destination end through the at least one relay using a full-duplex scheme after receiving the transmission confirmation. Therefore, it is possible to cancel self-interference and intra-flow interference and to stably perform full-duplex communication.

The full-duplex communication method may further include the destination end sending an ACK signal to the source end through the at least one relay in reverse order after receiving the data, thereby stably performing communication.

The forward order and the reverse order may mean that, when a pair of nodes finishes transmission or reception, a next pair of nodes starts transmission or reception. Therefore, it is possible to stably acquire information on various factors influencing self-interference and intra-flow interference.

Upon sending the transmission request in forward order, the at least one relay may acquire information necessary to cancel self-interference. The information necessary to cancel self-interference may include gain G, an amplification coefficient $\beta$, forward delay $T_F$ and propagation delay $\delta$.

Upon sending the transmission confirmation in reverse order, the at least one relay may acquire information necessary to cancel intra-flow interference. Upon sending the transmission confirmation in reverse order, the at least one relay may operate in a state of cancelling self-interference. Accordingly, it is possible to accurately acquire information necessary to cancel intra-flow interference.

Upon transmitting the data, the at least one relay may cancel self-interference and intra-flow interference from a received signal using a first cancellation signal for cancelling self-interference acquired upon sending the transmission request in forward order and a second cancellation signal for cancelling intra-flow interference acquired upon sending the transmission confirmation in reverse order. Therefore, it is possible to perform full-duplex communication using the cancellation signal for cancelling interference from the received signal.

When the at least one relay is in the ready state, a signal having a predetermined pattern may be transmitted as the same output as when the at least one relay performs transmission and reception, such that cancellation of self-interference and intra-flow interference starts before receiving actual data, increasing interference cancellation effect.

A pipeline transmission request frame transmitted upon sending the transmission request in forward order may include a preamble, a hop count, a destination address and a source address, and the preamble may include a training symbol and a signal field.

Advantageous Effects

According to the present invention, it is possible to stably perform full-duplex communication in a multi-hop wireless network while improving throughput.

BEST MODE

Hereinafter, an embodiment of the present invention will be described in detail with reference to the accompanying drawings. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Although the full-duplex communication method of the present invention is preferably provided in a wireless network environment in which a plurality of relays is provided, the present invention is applicable to an environment in which one relay is provided.

The full-duplex communication method of the present invention may be selected from among a plurality of communication methods and used as a best communication mode suitable for a communication environment. The full-duplex communication method of the present invention can efficiently cancel self-interference and intra-flow interference to efficiently cancel interference.

In the present invention, uplink and downlink communication are performed through nodes in order to efficiently cancel self-interference and intra-flow interference. Through uplink and downlink communication for a short time, each node can accurately confirm interference from moment to moment. Accordingly, full-duplex communication for a 5G wireless communication network can be efficiently supported.

Figure 1:
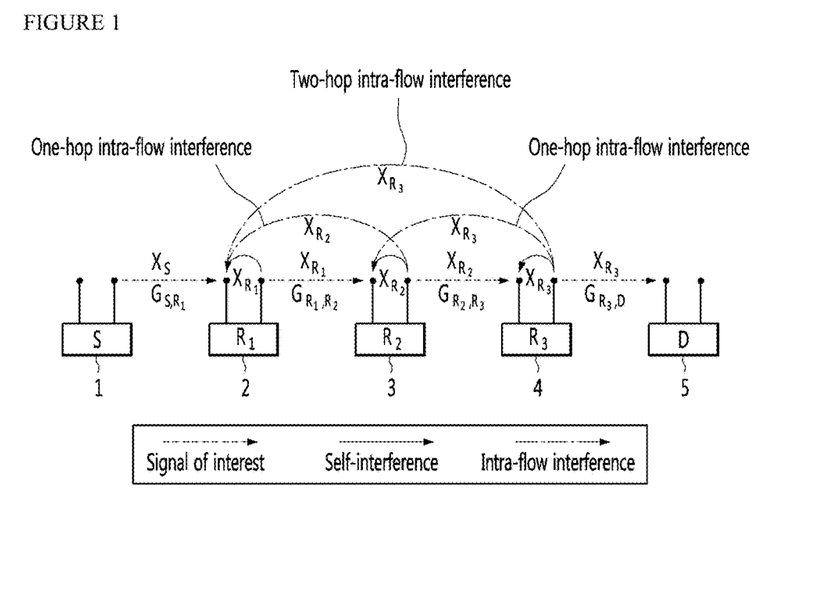
FIG. 1 is a diagram showing a multi-hop wireless network, to which an embodiment is applied.

FIG. 1 is a diagram showing a multi-hop wireless network, to which an embodiment is applied.

Referring to FIG. 1, a source end 1 for transmitting a source signal and a destination end 5 for finally receiving the source signal are shown. A first relay 2, a second relay 3 and a third relay 4 are provided between the source end 1 and the destination end 5. Of course, the number of relays is not limited thereto. In the multi-hop wireless network, many relays may be geographically provided between the source end 1 and the destination end 5. A predetermined number of relays may be selected from among the many relays.

In order to perform the full-duplex communication method, the first relay 2 receives the source signal (signal of interest) from the source end 1 and, at the same time, transmits the source signal to the second relay 3. However, the signal transmitted from the first relay 2 to the second relay 3 causes self-interference in the first relay 2. For example, the signal transmitted by the transmit antenna of the first relay 2 may be received by the receive antenna of the first relay 2 and recognized as the source signal. Accordingly, self-interference should be appropriately cancelled. Self-interference may be caused in the other nodes. Accordingly, self-interference should be cancelled in all nodes, in order to appropriately perform the full-duplex communication method.

In order to perform the full-duplex communication method, a plurality of nodes should simultaneously perform transmission and reception. Accordingly, the signals respectively transmitted by the second relay 3 and the third relay 4 may be received by undesired relay nodes. That is, the signal transmitted by the second relay may be received by the first relay 2, and the signal transmitted by the third relay node 4 may be received by the first relay node 2 and the second relay node 3. At this time, the relay nodes, which have received the signals, may recognize the received signals as source signals. This may be referred to as intra-flow interference (IFI).

Intra-flow interference may be generated in other nodes. Accordingly, intra-flow interference may be appropriately cancelled in all pairs of nodes. For example, one-hop intra-flow interference, two-hop intra-flow interference, three-hop intra-flow interference, etc. may be generated and thus need to be appropriately cancelled.

Equation 1 shows a signal received by each node. Equation 1 shows a received signal including self-interference and intra-flow interference.

$$Y_{R_1} = \underbrace{G_{S,R_1} X_S}_{signal\ of\ interest} + \underbrace{G_{R_1,R_1} X_{R_1}}_{self-interference} + \underbrace{\sum_{i=2}^{r} G_{R_i,R_1} X_{R_i}}_{intra-flow\ interference} + N_{R_1} \quad \text{Equation 1}$$

$$Y_{R_m} = \underbrace{G_{R_{m-1},R_m} X_{R_{m-1}}}_{signal\ of\ interest} + \underbrace{G_{R_m,R_m} X_{R_m}}_{self-interference} +$$

$$\underbrace{\sum_{i=m+1}^{r} G_{R_i,R_m} X_{R_i} + N_{R_m}}_{intra-flow\ interference}, \text{for } m = 2, \ldots, (r-1)$$

$$Y_{R_r} = G_{R_{r-1},R_r} X_{R_{r-1}} + G_{R_r,R_r} X_{R_r} + N_{R_r}$$

$$Y_D = G_{R_r,D} X_{R_r} + N_D$$

where, G denotes gain and R denotes a relay. For example, $G_{R_i,R_j}$ denotes gain between an i-th relay Ri and a j-th relay Rj. $G_{R_i,R_i}$ denotes gain between a transmit antenna and a receive antenna of the i-th relay $R_i$. X denotes a codeword. N denotes noise. r denotes the number of relays.

Meanwhile, in forward communication, intra-flow interference, for example, intra-flow interference with the third relay 4 may be treated as noise in the first relay 2. Although described below in detail, intra-flow interference exponentially decreases as the number of hops increases and thus has insignificant influence on full-duplex communication.

In the embodiment, an amplify-forward (AF) scheme may be applied to amplify and transmit a received signal to a next node. Instead of the AF scheme, a decode-amplify-forward (DF) scheme may be applied. In addition, delay may be generated in signal transmission and reception. In consideration of amplification and signal delay, Equation 1 may be changed to Equation 2.

$$Y_{R_1}[t] = G_{S,R_1} X_S[t] + G_{R_1,R_1} \beta_{R_1} X_{R_1}[t] + \sum_{i=2}^{r} G_{R_i,R_1} \beta_{R_i} \left( \prod_{j=2}^{i} G_{R_{j-1},R_j} \beta_{j-1} \right) X_{R_1}\left[ t - \left( \sum_{k=2}^{i} (2\delta_k + T_F) \right) \right] + N_{R_1}$$

$$Y_{R_m}[t] = G_{R_{m-1},R_m} \beta_{R_{m-1}} X_{R_{m-1}}[t] + G_{R_m,R_m} \beta_{R_m} X_{R_m}[t] + \sum_{i=m+1}^{r} G_{R_i,R_m} \beta_{R_i} \left( \prod_{j=m+1}^{i} G_{R_{j-1},R_j} \beta_{j-1} \right) X_{R_m}\left[ t - \left( \sum_{k=m+1}^{i} (2\delta_k + T_F) \right) \right] + N_{R_m}, \text{ for } m = 1, \ldots, r-1$$

$$Y_{R_r}[t] = G_{R_{r-1},R_r} \beta_{R_{r-1}} X_{R_{r-1}}[t] + G_{R_r,R_r} \beta_{R_r} X_{R_r}[t] + N_{R_r}$$

$$Y_D[t] = G_{R_r,D} \beta_{R_r} X_{R_r}[t] + N_D.$$

Equation 2

In Equation 2, β denotes an amplification factor (AF). $T_F$ denotes forwarding delay in a relay node. δi denotes propagation delay in an i-th hop.

Then, influence of self-interference and intra-flow interference may be cancelled by inserting a cancellation signal into a received signal of a specific node.

The cancellation signal may be expressed by Equation 3.

$$C_{SI,R_m}[t] = \hat{G}_{R_m,R_m} \beta_{R_m} X_{R_m}[t],$$

$$C_{IFI,R_m}[t] = \sum_{i=m+1}^{r} \hat{G}_{R_i,R_m} \hat{\beta}_{R_i,R_m} \left( \prod_{j=m+1}^{i} \hat{G}_{R_{j-1},R_j} \hat{\beta}_{j-1,R_m} \right) X_{R_m}\left[ t - \left( \sum_{k=m+1}^{i} (2\hat{\delta}_k + \hat{T}_F) \right) \right]$$

Equation 3 where, $C_{SI,R_m}[t]$ denotes a cancellation signal for self-interference (SI), and $C_{IFI,R_m}[t]$ denotes a cancellation signal for intra-flow interference (IFI). "^" denotes estimation.

When the cancellation signal is inserted, the received signal of each node may be changed to Equation 4 by inserting Equation 3 having a negative value into Equation 2.

$$Y_{R_1}[t] = G_{S,R_1} X_S[t] + \underbrace{G_{R_1,R_1} \beta_{R_1} X_{R_1}[t] - C_{SI,R_1}[t]}_{\text{self-interference cancellation part}} + \underbrace{\sum_{i=2}^{r} G_{R_i,R_1} \beta_{R_i} \left( \prod_{j=2}^{i} G_{R_{j-1},R_j} \beta_{j-1} \right) X_{R_1}\left[ t - \left( \sum_{k=2}^{i} (2\delta_k + T_F) \right) \right] - C_{IFI,R_1}[t]}_{\text{intra-flow interference cancellation part}} + N_{R_1}$$

$$Y_{R_m}[t] = G_{R_{m-1},R_m} \beta_{R_{m-1}} X_{R_{m-1}}[t] + G_{R_m,R_m} \beta_{R_m} X_{R_m}[t] - C_{SI,R_m}[t] + \sum_{i=m+1}^{r} G_{R_i,R_m} \beta_{R_i} \left( \prod_{j=m+1}^{i} G_{R_{j-1},R_j} \beta_{j-1} \right) X_{R_m}\left[ t - \left( \sum_{k=m+1}^{i} (2\delta_k + T_F) \right) \right] - C_{IFI,R_m}[t] + N_{R_m}, \text{ for } m = 1, \ldots, r-1$$

$$Y_{R_r}[t] = G_{R_{r-1},R_r} \beta_{R_{r-1}} X_{R_{r-1}}[t] + G_{R_r,R_r} \beta_{R_r} X_{R_r}[t] - C_{SI,R_r}[t] + N_{R_r}$$

$$Y_D[t] = G_{R_r,D} \beta_{R_r} X_{R_r}[t] + N_D$$

Equation 4

Referring to Equation 4 above, a difference between an estimated value obtained through estimation (^) and an actual value may depend on accuracy of each estimated value. The estimated value includes gain G, an amplification coefficient β, forward delay $T_F$ and propagation delay δ. Meanwhile, the estimated value may be changed by applying a cancellation coefficient. For example, as in $\hat{G}_{R_i,R_j} = \tau_{R_i,R_j} G_{R_i,R_j}$, the estimated value may be changed by applying the cancellation coefficient $\tau_{R_i,R_j}$. The cancellation coefficient may depend on an analog/digital cancellation technique used for a full-duplex communication method.

Influence of self-interference and intra-flow interference may be cancelled through Equation 4 and thus full-duplex communication may be performed in the multi-hop wireless network. In order to obtain the cancellation signal for cancelling self-interference and intra-flow interference in the multi-hop wireless network, gain G, an amplification coefficient β, forward delay $T_F$ and propagation delay δ should be obtained. Hereinafter, a communication method of extracting information necessary to acquire the cancellation signal and transmitting data from a source end to a destination end will be described.

Figure 2:
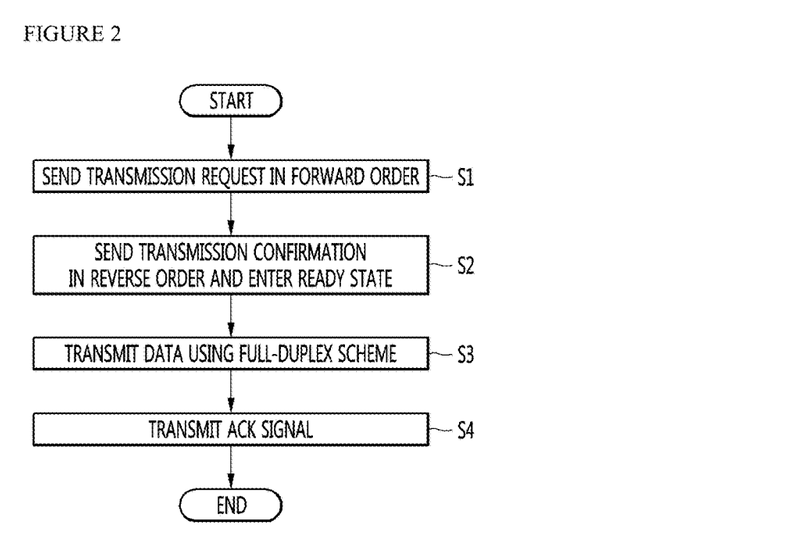
FIG. 2 is a flowchart illustrating a full-duplex communication method for a multi-hop wireless network according to an embodiment.
Figure 3:
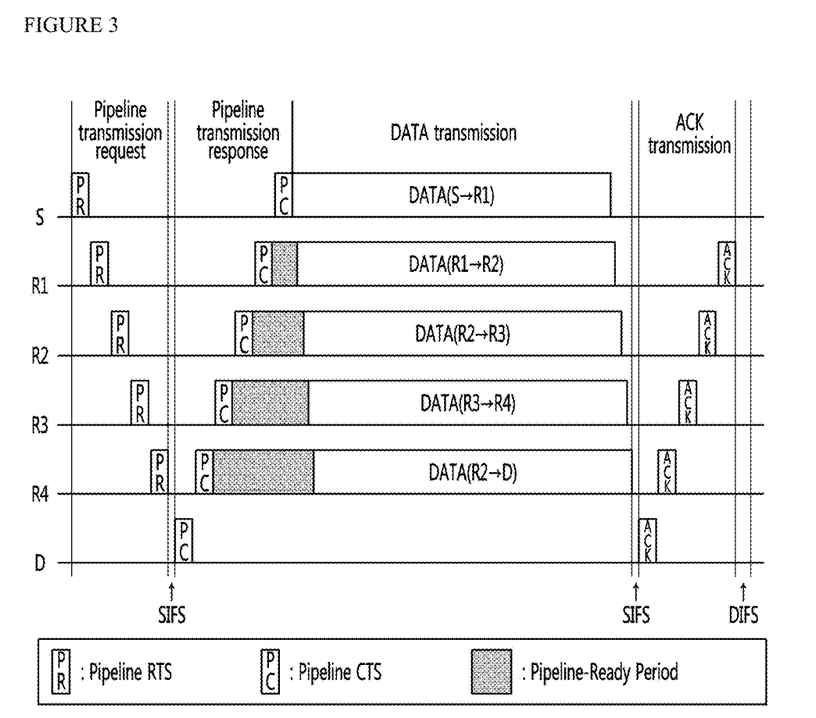
FIG. 3 is a timing diagram of nodes.

FIG. 2 is a flowchart illustrating a full-duplex communication method for a multi-hop wireless network according to an embodiment, and FIG. 3 is a timing diagram of nodes. In the embodiment, assume that four relays are provided.

Referring to FIGS. 2 and 3, the source end (S) sends a transmission request to the destination end (D) in forward order (S1). The destination end (D) sends transmission confirmation to the source end S in response to the transmission request in reverse order and the relays enter a ready state (S2). The source end (S) 1, which has received the transmission confirmation, transmits data to the destination end (D) through the relays ($R_1$, $R_2$, $R_3$ and $R_4$) using a full-duplex scheme (S3). Thereafter, the destination end (D) transmits an ACK signal to the source end (S) in reverse order (S4).

Here, the forward order indicates a direction from the source end to the destination end and may mean that, when a pair of nodes finishes transmission and reception, and another pair of nodes starts transmission and reception. The reverse order indicates a direction from the destination end to the source end and may mean that, when a pair of nodes finishes transmission and reception, another pair of nodes starts transmission and reception.

A short interframe space (SIFS) may be present between steps and a distributed interframe space (DIFS) may be present after communication is finished.

The steps will be described in greater detail.

First, in step S1 of transmitting the transmission request in forward order, a predetermined signal is sent from the source end to the destination end to obtain gain G, an amplification coefficient $\beta$, forward delay $T_F$ and propagation delay $\delta$ of each node necessary for the cancellation signal for cancelling self-interference.

More specifically, in order to send data from the source end (S) to the destination end (D) through packets, the source end (S) transmits a pipeline request (pipeline request to send (RTS)) to the destination end through the relays before transmitting the data. The pipeline RTS may be sent through a predetermined pipeline transmission request frame. The configuration of the pipeline transmission request frame will be described below. The relay, which has received the pipeline RTS from the source end, performs a process of increasing a hop count in the pipe line transmission request frame and then sending the pipeline RTS to a next node. This process may be performed until the pipeline transmission request frame reaches the destination end.

By sending the transmission request in forward order, each relay may estimate channel state information of self-interference, a forwarding path for transmission and delay information. This is because each relay has a receive antenna and a transmit antenna and thus can check self-interference upon transmission and predict forward delay by referring to forward transmission of the relay. Here, the path may be previously checked or may be selected using an instantaneous value such as propagation intensity.

In addition, the cancellation coefficient for self-interference may be determined using the estimated information.

Thereafter, step S2 of transmitting the transmission confirmation in reverse order is performed after an SIFS. By sending a predetermined signal from the destination end to the source end, information necessary for the cancellation signal for cancelling intra-flow interference may be acquired.

More specifically, the destination end sends pipeline confirmation (PC) (pipeline clear to send (CTS)) to the source end in response to the pipeline request (PR) (pipeline RTS). The pipeline confirmation may be sent through a predetermined pipeline transmission confirmation frame. The pipeline transmission confirmation frame will be described below. The relay, which has received the pipeline confirmation from the destination end in reverse order, adds the cancellation signal for cancelling self-interference to cancel influence of self-interference and stabilize a noise level. Accordingly, the cancellation signal for cancelling intra-flow interference may be obtained.

The cancellation signal for cancelling intra-flow interference will be described in greater detail. For example, when one relay (e.g., $R_4$) transmits the pipeline confirmation, the other relays (e.g., $R_1$, $R_2$ and $R_3$) located at the previous stages thereof may acquire channel state information of intra-flow interference of one hop (e.g., $R_3$), two hops (e.g., $R_2$) or three hops (e.g., $R_1$). At this time, self-interference is not generated and only intra-flow interference is generated. This process may be performed until the transmission confirmation transmitted in reverse order reaches the source end. Each pair of relay nodes (which may include one hop, two hops or three hops) may obtain channel state information corresponding to infra-flow interference. In addition, the cancellation coefficient for cancelling intra-flow interference may be determined using the estimated information.

After any one relay node sends the pipeline confirmation, the relay node enters a pipeline ready period. In the pipeline ready period, a signal having a predetermined pattern is transmitted as the same output as the pipeline confirmation (PC). Accordingly, influence of intra-flow interference caused by another relay may be cancelled. For example, when any one relay $R_4$ enters the pipeline ready period and the relay $R_3$ located at the previous stage thereof transmits the pipeline confirmation (PC), the other relays $R_1$ and $R_2$ located at the previous stage thereof may detect only influence caused by the relay $R_3$ and may accurately detect intra-flow interference of the relay $R_3$. Therefore, intra-flow interference may be detected and cancelled. Of course, data reception may be prepared.

By sending the transmission confirmation in reverse order, information necessary to cancel intra-flow interference may be acquired.

Information necessary to cancel self-interference is confirmed in step S1 of sending the transmission request in forward order and information necessary to cancel intra-flow interference is acquired in step S2 of sending the transmission confirmation in reverse order. Accordingly, data may be transmitted using the full-duplex method in forward order without influence of interference (S3) and an ACK signal may be transmitted in reverse order, thereby finishing data transmission (S4).

Figure 4:
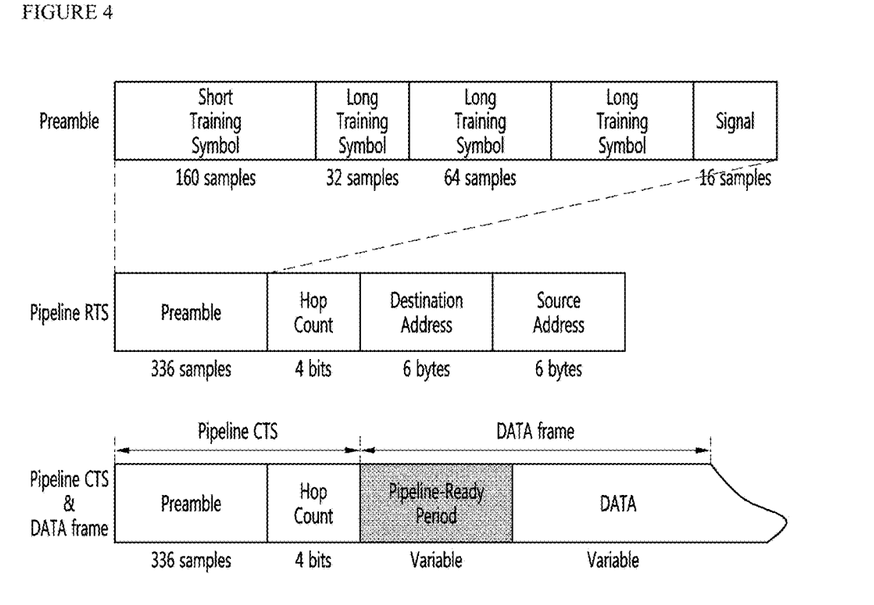
FIG. 4 is a diagram showing a pipeline transmission request frame and a pipeline transmission confirmation frame.

FIG. 4 is a diagram showing a pipeline transmission request frame and a pipeline transmission confirmation frame.

Referring to FIG. 4, the pipeline transmission request frame may include a preamble, a hop count, a destination address and a source address.

The preamble may include a training symbol and a signal field. The training symbol may be used for automatic gain control, carrier frequency offset estimation and symbol timing estimation. The signal field may configure a BPSK symbol for channel training.

The hop count indicates the number of hops from the source and may gradually increase as a distance from the source end increases. Accordingly, the number of hops may be confirmed. The address field may include the destination address and the source address.

The pipeline transmission confirmation frame may include a preamble and a hop count, similarly to the pipeline transmission request frame. The pipeline ready period is present after the pipeline transmission confirmation frame. The pipeline ready period may be a period for waiting for data transmission (that is, full-duplex communication) after self-interference and intra-flow interference are cancelled by the cancellation signals. The length of the pipeline ready period may depend on propagation delay, forward delay and a frame transmission time of a previous relay node.

A result of simulating the full-duplex communication method for the multi-hop wireless network according to the embodiment using MATLAB will be described. The simulation condition is shown in Table 1 below.

TABLE 1

| System Parameters | | | |
|---|---|---|---|
| Average distance of hops | 50 m | Distance btw. antennas | 0.25 m |
| Pipeline RTS | 436 bits | Pipeline CTS | 340 bits |
| DATA frame | 15000 bytes | ACK | 340 bits |
| Basic rate | 6 Mbps | Data rate | 54 Mbps |
| DIFS | 28 μs | SIFS | 10 μs |
| SINR threshold | 6 dB | Background noise | −70 dBm |
| Propagation delay | 46 ps | Forwarding delay ($T_F$) | 100 μs |

The result of performing simulation under the condition shown in Table 1 will be described using various graphs.

Figure 5:
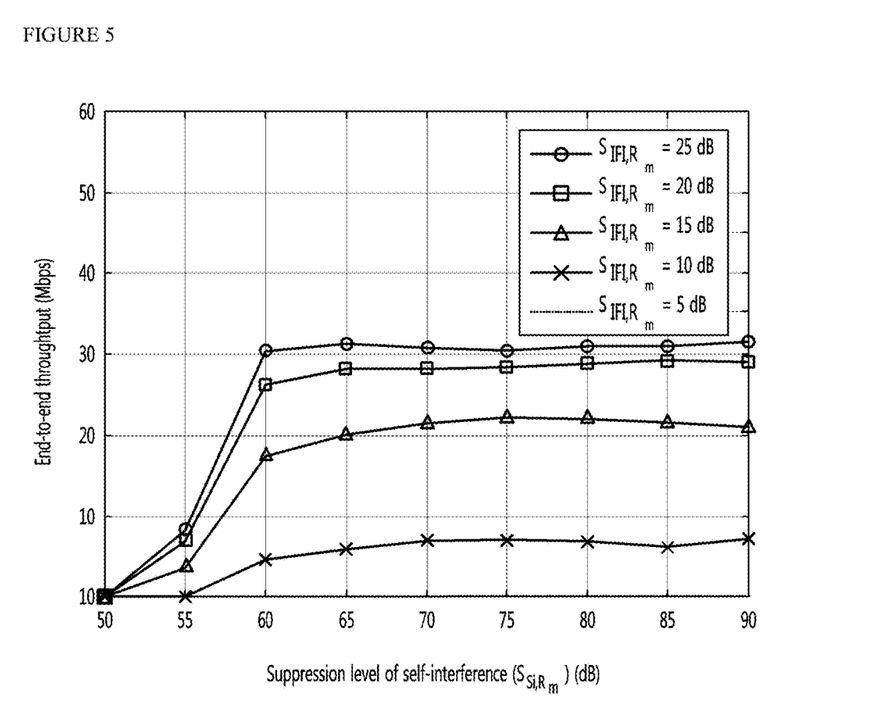
FIG. 5 is a graph showing throughput from a source end to a destination end when the number of hops is 6.

FIG. 5 is a graph showing throughput from a source end to a destination end when the number of hops is 6.

Referring to FIG. 5, a result of measuring throughput while changing suppression levels $S_{SI}$ and $S_{IFI}$ of self-interference and intra-flow interference are shown. Here, the suppression levels may be given as shown in Equation 5.

$$S_{SI,R_m}[t] = \left( \frac{E(|G_{R_m,R_m}\beta_{R_m}X_{R_m}[t] - C_{SI,R_m}[t]|^2)}{E(|G_{R_m,R_m}\beta_{R_m}X_{R_m}[t]|^2)} \right) \quad \text{Equation 5}$$

$$S_{IFI,R_m}[t] = \left( \frac{E\left( \left| \sum_{i=2}^{r} G_{R_i,R_1}\beta_{R_i} \left( \prod_{j=2}^{i} G_{R_{j-1},R_j}\beta_{R_{j-1}} \right) \right|^2 \cdot \left| X_{R_1}\left[ t - \left( \sum_{k=2}^{i} (2\delta_k - T_F) \right) \right] - C_{IFI,R_1}[t] \right|^2 \right)}{E\left( \left| \sum_{i=2}^{r} G_{R_i,R_1}\beta_{R_i} \left( \prod_{j=2}^{i} G_{R_{j-1},R_j}\beta_{R_{j-1}} \right) \right|^2 \cdot \left| X_{R_1}\left[ t - \left( \sum_{k=2}^{i} (2\delta_k - T_F) \right) \right] \right|^2 \right)} \right)^{-1}$$

In Equation 5 above, a numerator denotes interference remaining after cancelling self-interference and intra-flow interference and a denominator denotes self-interference and intra-flow interference.

As can be seen from FIG. 5, the suppression level of self-interference rapidly increases up to 60 dB except the case where the suppression level of intra-flow interference is 5 dB, but rarely increases after the suppression level of intra-flow interference reaches 20 dB.

Figure 6:
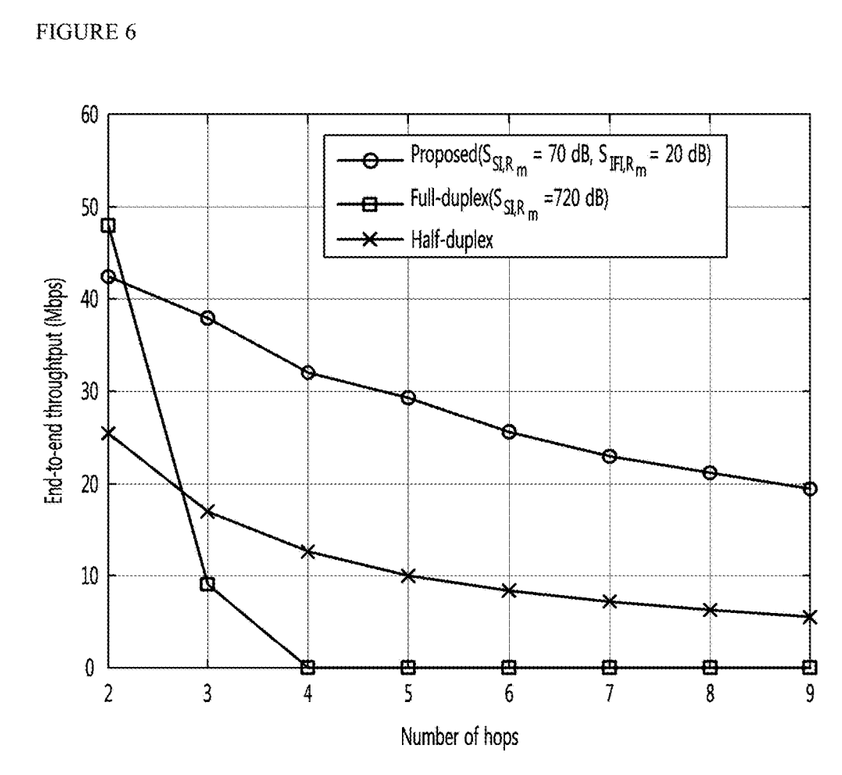
FIG. 6 is a graph showing change in throughput from a source end to a destination end as the number of hops increases.

FIG. 6 shows change in throughput from a source end to a destination end as the number of hops increases.

Referring to FIG. 6, it can be seen that, when full-duplex communication is performed without cancelling intra-flow interference, throughput rapidly decreases as the number of hops increases. In addition, throughput may increase by several hundreds % as compared to half-duplex communication.

Figure 7:
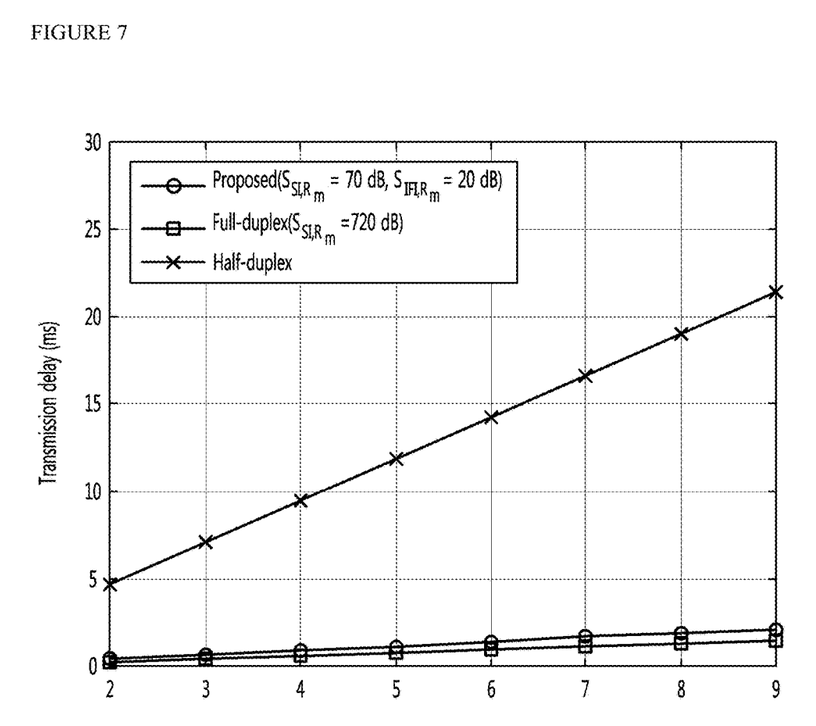
FIG. 7 is a graph showing comparison of delay performance as the number of hops increases.

FIG. 7 is a graph showing comparison of delay performance as the number of hops increases.

Referring to FIG. 7, it can be seen that a delay time significantly increases as the number of hops increases in half-duplex communication. This problem is not generated in full-duplex communication. However, if intra-flow interference is not cancelled, as shown in FIG. 6, throughput rapidly decreases, making perform communication impossible.

Figure 8:
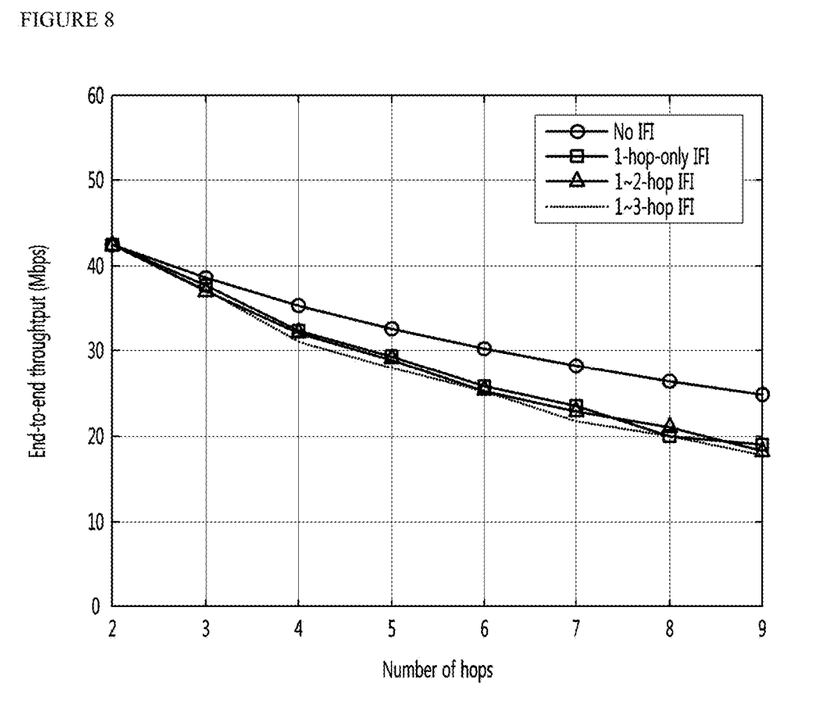
FIG. 8 is a graph showing throughput from a source end to a destination end calculated when the number of hops is changed and a range of a cancellation signal for cancelling intra-flow interference is changed.

FIG. 8 is a graph showing throughput from a source end to a destination end calculated when the number of hops is changed and a range of a cancellation signal for cancelling intra-flow interference is changed.

Referring to FIG. 8, no-IFI indicates that intra-flow interference is completely cancelled and 1-hop-only IFI indicates that any one relay is influenced by only one-hop intra-flow interference of one relay most adjacent thereto (e.g., $R_2$ is influenced by intra-flow interference of $R_3$), 1~2-hop IFI indicates that any one relay is influenced by intra-flow interference of two relays adjacent thereto (e.g., $R_2$ is influenced by intra-flow interference of $R_3$ and $R_4$), and 1~3-hop IFI indicates that any one relay is influenced by intra-flow interference of three relays adjacent thereto (e.g., $R_2$ is influenced by intra-flow interference of $R_3$, $R_4$ and $R_5$).

As can be seen from FIG. 8, one-hoe intra-flow interference is highest and two-hop intra-flow interference is very low. Therefore, in the embodiment, if intra-flow interference between all nodes is cancelled, overhead may increase due to a large amount of computation. Accordingly, by cancelling intra-flow interference of a most adjacent relay node, it is possible to improve throughput while reducing overhead.

Figure 9:
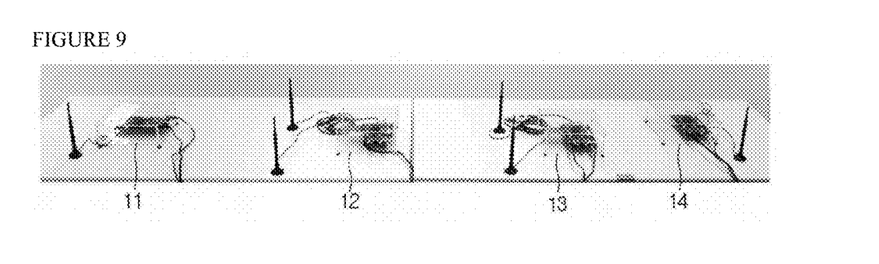
FIG. 9 is a diagram showing a system for implementing an embodiment as an actual product and conducting experimentation.

FIG. 9 is a diagram showing a system for implementing an embodiment as an actual product and conducting experimentation. Experimentation was conducted using a full-duplex pipeline multi-hop transmission scheme in a wireless open research platform (WARP). All WARP hardware used a carrier frequency of 2.4 GHz, an OFDM physical layer and a QPSK modulation scheme.

Referring to FIG. 9, each of the source end 11 and the destination end 14 has one antenna used for transmission and reception. Each of the first relay 12 and the second relay 13 has two antennas used to perform reception and transmission in full-duplex communication.

First, the transmission request is sent from the source end 11 to the destination end 14 in forward order. Information necessary to provide the cancellation signal for cancelling self-interference is acquired while transmitting the transmission request. The destination end 14 sends the transmission confirmation to the source end 11 in reverse order in response to the transmission request and the relays 12 and 13 enter the ready state. Information necessary to cancel intra-flow interference is acquired while sending the transmission confirmation. The source end 11, which has received the transmission confirmation, transmits data to the destination end 14 through the relays 12 and 13 using the full-duplex scheme. Thereafter, the destination end 14 transmits the ACK signal to the source end 11 in reverse order.

Figure 10:
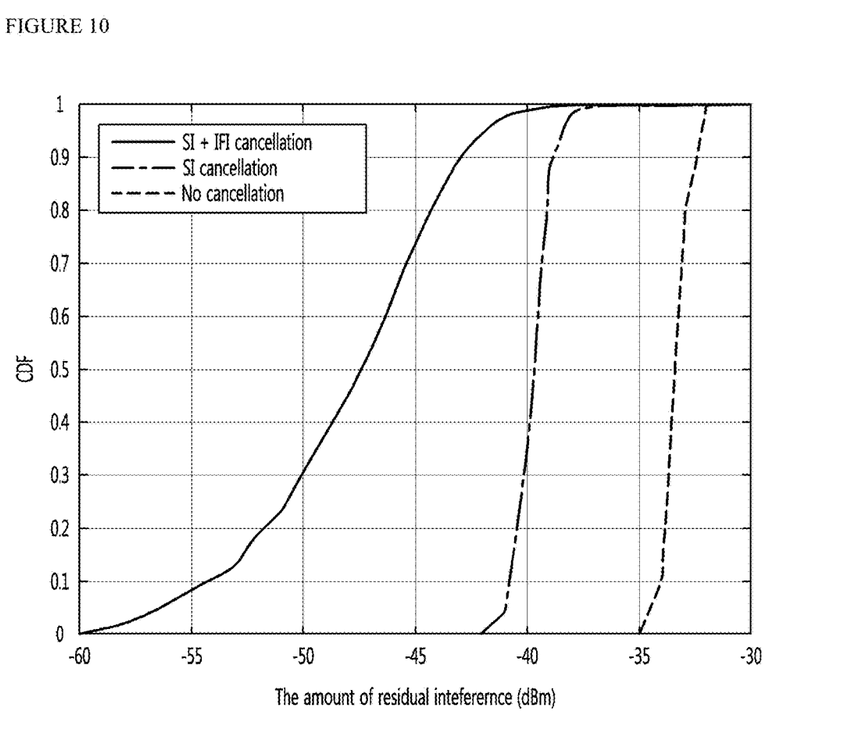
FIG. 10 is a graph showing the amount of residual interference when experimentation is conducted using the configuration of FIG. 9.

FIG. 10 is a graph showing the amount of residual interference when experimentation is conducted using the configuration of FIG. 9.

Referring to FIG. 10, the amounts of interference remaining when only self-interference is cancelled, when self-interference and intra-flow interference are cancelled and when self-interference and intra-flow interference are not cancelled are shown. As the result of experimentation, when only self-interference is cancelled, interference may not be substantially cancelled. When intra-flow interference is also cancelled, interference may be reduced to about 12 dB.

Figure 11:
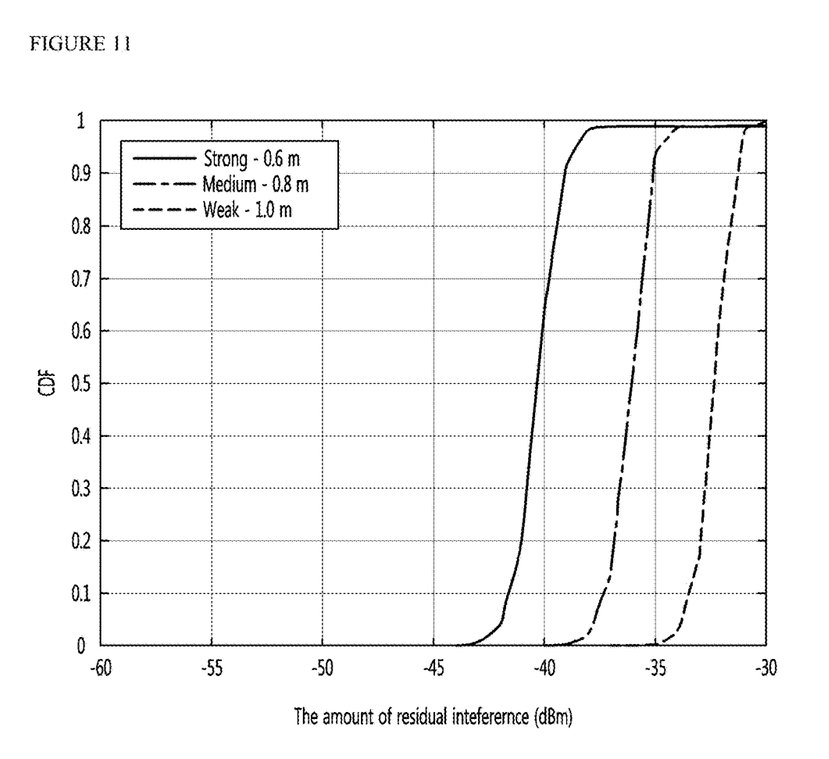
FIG. 11 is a graph showing the amount of residual interference when self-interference is cancelled while changing a distance between nodes.
Figure 12:
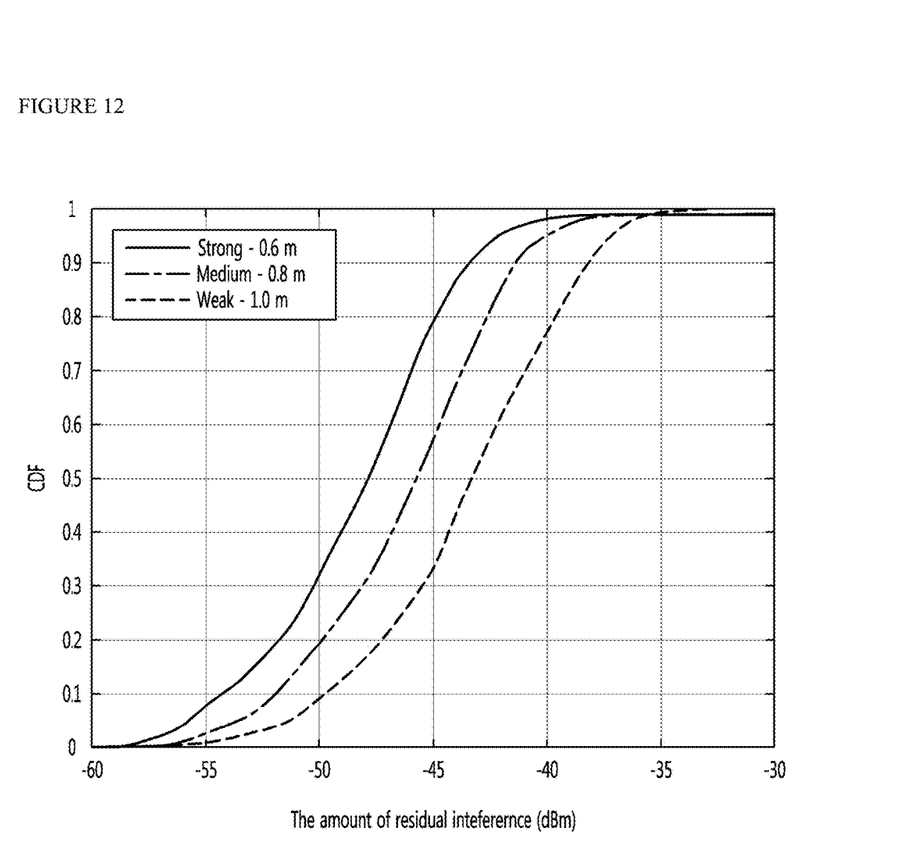
FIG. 12 is a graph showing the amount of residual interference when self-interference and intra-flow interference are cancelled while changing a distance between nodes.

FIG. 11 is a graph showing the amount of residual interference when self-interference is cancelled while changing a distance between nodes, and FIG. 12 is a graph showing the amount of residual interference when self-interference and intra-flow interference are cancelled while changing a distance between nodes.

Referring to FIGS. 11 and 12, it can be seen that self-interference is rarely changed according to the distance between nodes but intra-flow interference increases as the distance between the nodes decreases (see FIG. 11). However, it can be seen that the amount of suppressed interference increases as intra-flow interference increases, by cancelling influence of intra-flow interference (see FIG. 12). Accordingly, it can be seen that intra-flow interference needs to be cancelled in the multi-hop wireless relay network.

INDUSTRIAL AVAILABILITY

The present invention can reduce influence of interference in a multi-hop wireless network environment. Therefore, it is possible to improve throughput and increase a transfer rate. In addition, it is possible to further adapt to a next-generation communication network.

The invention claimed is:

1. A full-duplex communication method for a multi-hop wireless network including a source end for transmitting data, a destination end as a destination of the data and at least one relay for connecting the source end and the destination end wirelessly, the full-duplex communication method comprising:

sending a transmission request from the source end to the destination end through the at least one relay in forward order;

sending a transmission confirmation from the destination end to the source end through passing by the at least one relay in reverse order in response to the transmission request and the at least one relay entering a ready state; and transmitting the data from the source end to the destination end through the at least one relay using a full-duplex scheme after receiving the transmission confirmation, wherein, upon transmitting the data, the at least one relay cancels self-interference and intra-flow interference from a received signal using a first cancellation signal for cancelling the self-interference acquired upon sending the transmission request in the forward order and a second cancellation signal for cancelling the intra-flow interference acquired upon sending the transmission confirmation in the reverse order.

2. The full-duplex communication method according to claim 1, further comprising the destination end sending an ACK signal to the source end through the at least one relay in the reverse order after receiving the data.

3. The full-duplex communication method according to claim 1, wherein the forward order and the reverse order mean that, when a pair of nodes finishes transmission or reception, a next pair of nodes starts transmission or reception.

4. The full-duplex communication method according to claim 1, wherein information necessary to cancel the self-interference includes gain G, an amplification coefficient $\beta$, forward delay $T_F$ and propagation delay $\delta$.

5. The full-duplex communication method according to claim 1, wherein, upon sending the transmission confirmation in the reverse order, the at least one relay operates in a state of cancelling the self-interference.

6. The full-duplex communication method according to claim 1, wherein, when the at least one relay is in the ready state, a signal having a predetermined pattern is transmitted as same output as when the at least one relay is passed by, such that cancellation of the self-interference and the intra-flow interference starts before receiving actual data, increasing interference cancellation effect.

7. The full-duplex communication method according to claim 1, wherein a pipeline transmission request frame transmitted upon sending the transmission request in the forward order includes a preamble, a hop count, a destination address and a source address, and the preamble includes a training symbol and a signal field.

8. A full-duplex communication method for a multi-hop wireless network including a source end for transmitting data, a destination end as a destination of the data and at least one relay for connecting the source end and the destination end wirelessly, the full-duplex communication method comprising:

sending a transmission request from the source end to the destination end through the at least one relay in forward order;

sending a transmission confirmation from the destination end to the source end through passing by the at least one relay in reverse order in response to the transmission request and the at least one relay entering a ready state; and transmitting the data from the source end to the destination end through the at least one relay using a full-duplex scheme after receiving the transmission confirmation;

wherein, when the at least one relay is in the ready state, a signal having a predetermined pattern is transmitted as same output as when the at least one relay is passed by, such that cancellation of self-interference and intra-flow interference starts before receiving actual data, increasing interference cancellation effect.

* * * * *